United States Patent [19]

Devier et al.

[11] Patent Number: 5,348,115

[45] Date of Patent: Sep. 20, 1994

[54] CRUISE CONTROL FOR HYDRAULICALLY DRIVEN VEHICLE

[75] Inventors: Lonnie J. Devier; John J. Krone, both of Dunlap; Stephen V. Lunzman, Chillicothe; Howard A. Marsden, Pekin, all of Ill.

[73] Assignee: Caterpillar Inc., Peoria, Ill.

[21] Appl. No.: 95,567

[22] Filed: Jul. 19, 1993

Related U.S. Application Data

[62] Division of Ser. No. 821,100, Jan. 15, 1992, abandoned.

[51] Int. Cl.$^5$ ............................................... B60K 7/00
[52] U.S. Cl. .................................... 180/308; 180/307; 180/176
[58] Field of Search ............... 180/170, 174, 176, 177, 180/178, 242, 307, 308; 364/426.04

[56] References Cited

U.S. PATENT DOCUMENTS

| | | | |
|---|---|---|---|
| 3,448,577 | 6/1969 | Crawford | 180/242 X |
| 3,547,216 | 12/1970 | Marie | 180/178 |
| 3,708,031 | 1/1973 | Jania et al. | 180/178 |
| 4,400,935 | 8/1983 | Louis | 180/307 X |
| 4,915,075 | 4/1990 | Brown. | |
| 5,137,100 | 8/1992 | Scott et al. | 180/307 X |
| 5,147,010 | 9/1992 | Olson et al. | 180/308 X |
| 5,161,634 | 11/1992 | Ichihara et al. | 180/170 X |

FOREIGN PATENT DOCUMENTS

| | | | |
|---|---|---|---|
| 2137693 | 2/1973 | Fed. Rep. of Germany | 180/177 |
| 2315077 | 10/1974 | Fed. Rep. of Germany | 180/178 |

Primary Examiner—Brian L. Johnson
Attorney, Agent, or Firm—R. Carl Wilbur

[57] ABSTRACT

An apparatus is provided for use in a vehicle having a source of pressurized fluid and a pair of hydraulic drive motors connected to the pressurized fluid source and powered thereby. First and second ground engaging devices are connected to and driven by the first and second motors, respectively. The apparatus includes first and second control members, each being positionable at a plurality of locations for indicating a desired speed and direction for a respective drive motor. First and second actuators are adapted to sense the position of the first and second control members, respectively, and responsively control the direction and rate of fluid flow to the first and second drive motors. A set switch is movable between first and second positions and is adapted to produce a set speed signal in the second position. A set speed device is provided for receiving the set speed signal and operating the drive motors at a constant speed in response to the set speed signal, wherein the speed of the motors is responsive to the position of the control members upon reception of the set speed signal.

15 Claims, 3 Drawing Sheets

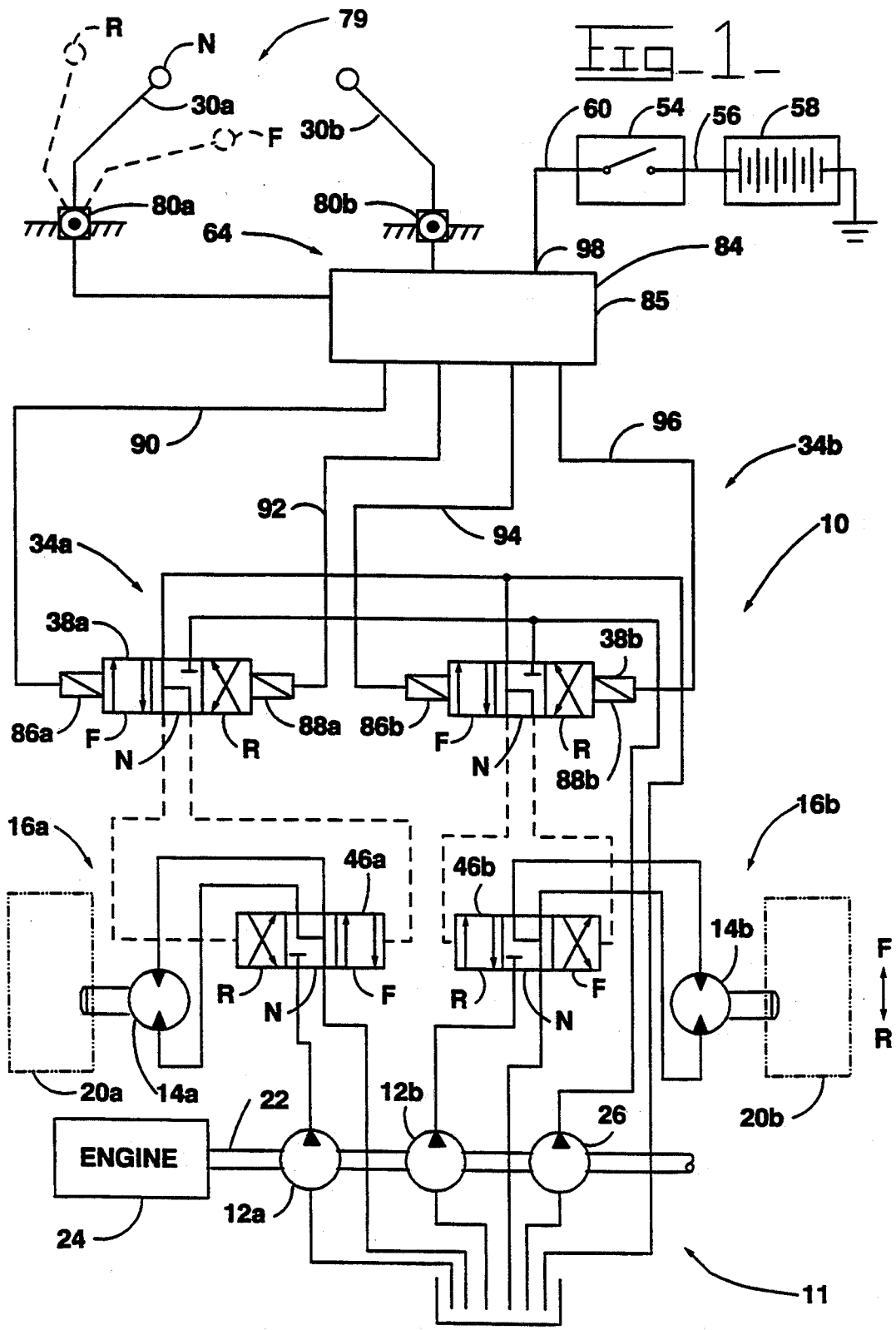
FIG_1

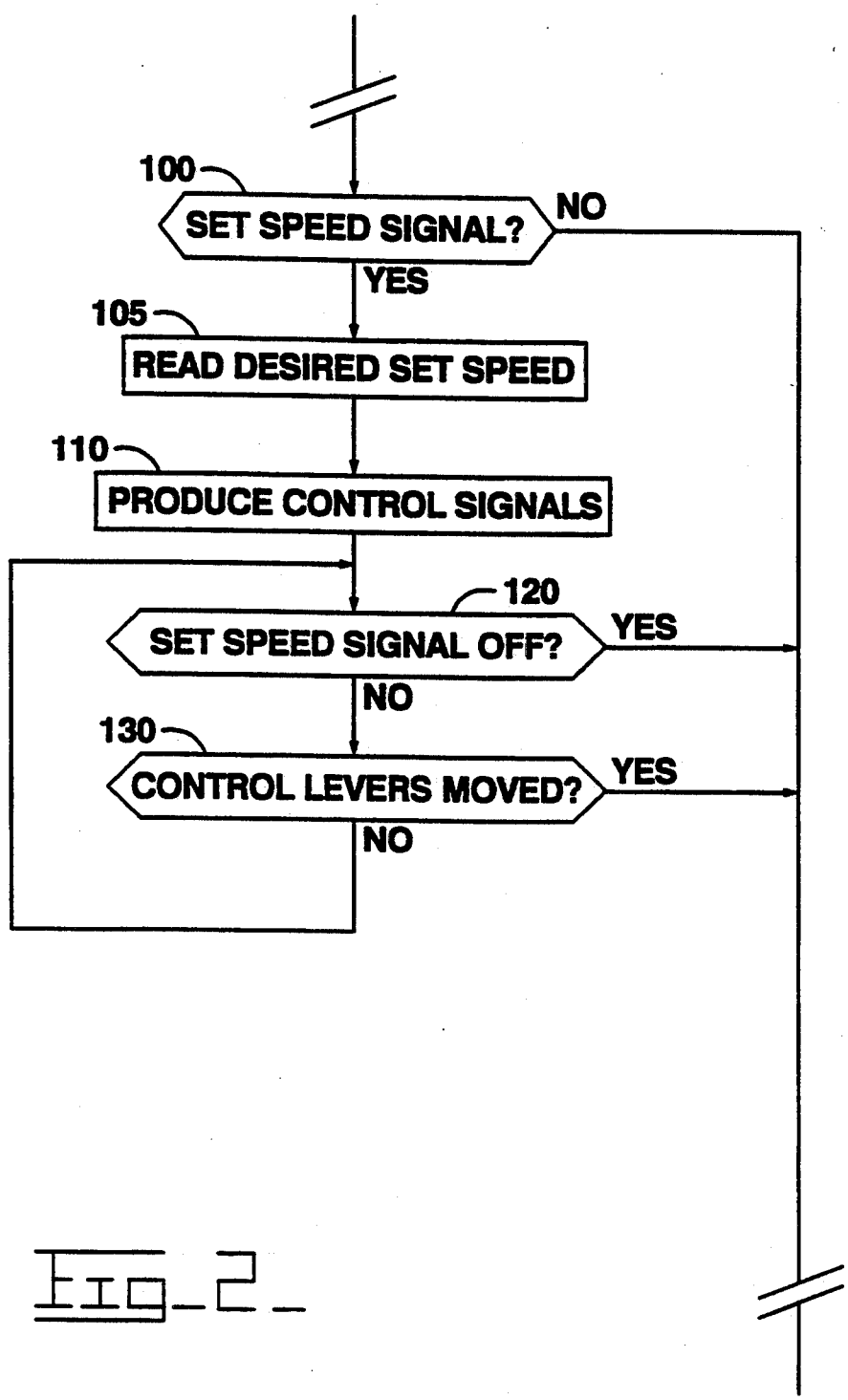
Fig_2

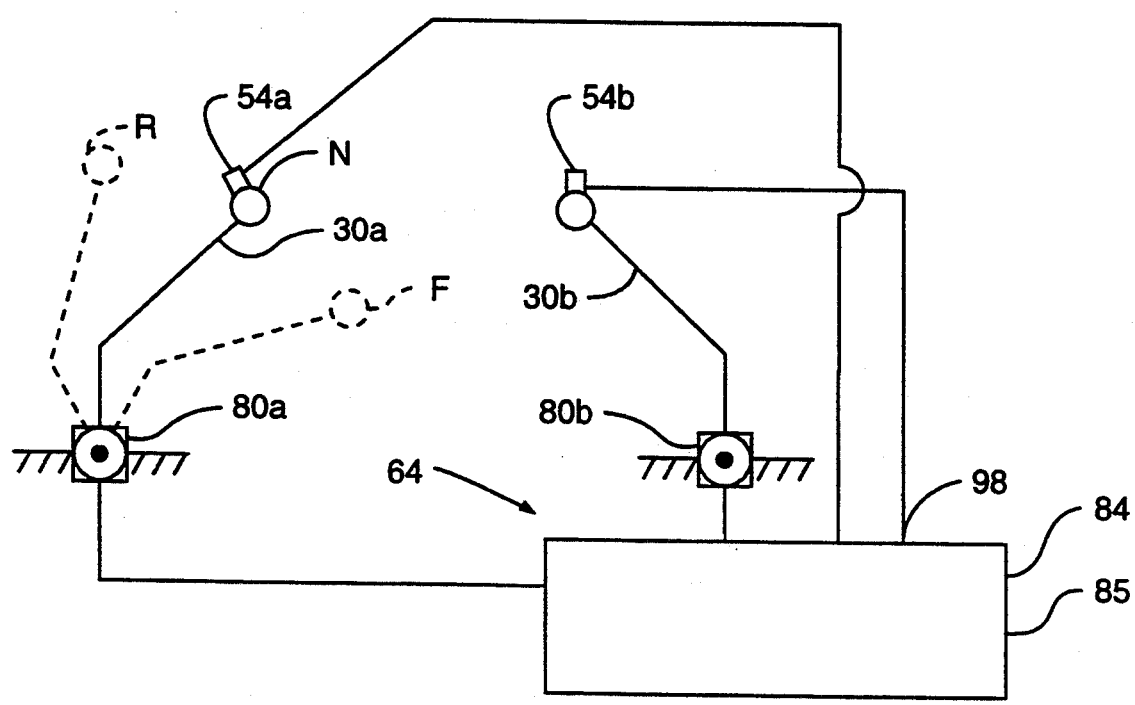

ND VEHICLE

This is a divisional application of application Ser. No. 07/821,100 filed Jan. 15, 1992 now abandoned.

TECHNICAL FIELD

The present invention is directed towards a cruise control for a hydraulically driven vehicle and, more particularly, towards a system for automatically maintaining separate hydraulic drive motors at a selected speed.

BACKGROUND ART

In construction vehicles, such as track type tractors or excavators, it is common to employ separate hydrostatic transmissions for driving individual ground engaging devices such as tracks or wheels. Each hydrostatic transmission typically includes a fluid pump adapted to supply pressurized fluid to a respective drive motor for controlling the speed and direction thereof. Each hydraulic motor is in turn mechanically connected to a respective ground engaging device for propelling the vehicle.

The speed and direction of the vehicle is controlled in response to the flow rate and direction of pressurized fluid applied to the drive motors. Rectilinear vehicle travel is achieved by operating the drive motors at the same speed and in the same direction. Conversely, cornering operations can be effected by varying the speeds of the individual drive motors. Typically, separate control levers or pedals are provided for controlling the speeds of the individual drive motors. For example, in an excavator, left and right control levers are provided for controlling the speed and direction of left and right drive motors. The control levers are manually movable between a plurality of forward and reverse positions and are normally biased to a neutral position. In most applications, the control levers are connected to either electro-hydraulic or hydro-mechanical control systems which control the rate and direction of fluid flow to the motors in response to the position of the control levers.

In many instances, it is desirable to maintain the motors at a constant speed for an extended duration. In existing systems, such an operation requires the operator to maintain the control levers at fixed position for an extended period of time. As should be apparent, this can become tiresome and fatiguing for the vehicle operator.

The present invention is directed to overcoming the problem as set forth above.

DISCLOSURE OF THE INVENTION

In a first aspect of the present invention, an apparatus is provided for use in a vehicle having a source of pressurized fluid, and a pair of hydraulic drive motors connected to the pressurized fluid source and powered thereby. First and second ground engaging devices are connected to and driven by the first and second motors, respectively. The apparatus includes first and second control members, each being positionable at a plurality of locations for indicating a desired speed and direction for a respective drive motor. First and second actuators are adapted to sense the position of the first and second control members, respectively, and responsively control the direction and rate of fluid flow to a respective drive motor. A set switch is movable between first and second positions and is adapted to produce a set speed signal in the second position. A set speed device is provided for receiving the set speed signal and operating the drive motors at a constant speed in response to the set speed signal. The speed of the motors is responsive to the position of the control members upon reception of the set speed signal.

In a second aspect of the present invention, an apparatus is provided for use in a vehicle having a source of pressurized fluid and a pair of hydraulic drive motors connected to the pressurized fluid source and powered thereby. First and second ground engaging devices are connected to and driven by the first and second motors, respectively. The apparatus includes a first device for producing a desired speed/direction signal corresponding to a desired speed and direction of travel for the vehicle. A processor is provided for receiving the desired speed/direction signal and processing the signal to responsively produce first and second control signals. First and second actuators are adapted to receive the first and second control signals, respectively, and responsively control the direction and rate of fluid flow to the first and second drive motors. A set switch is movable between first and second positions and is adapted to produce a set speed signal in the second position. A set speed device is provided for receiving the set speed signal and for responsively entering a set speed mode wherein the first and second control signals are maintained at a constant magnitude, thereby causing the drive motors to operate at a constant speed. The speeds of the motors being responsive to the magnitude of the desired speed/direction signal upon reception of the set speed signal.

BRIEF DESCRIPTION OF THE DRAWINGS

FIG. 1 is schematic of an electro-hydraulic control system incorporating a an embodiment of the present invention; and FIG. 2 is a flow chart illustrating the operation of a computer program for practicing an embodiment of the present invention.

FIG. 3 is a schematic diagram of a portion of the electro-hydraulic control system of an embodiment of the present invention shown in FIG. 1.

BEST MODE FOR CARRYING OUT THE INVENTION

Referring now to FIG. 1, an embodiment of the present invention will be discussed. FIG. 1 is a schematic illustration of a hydraulic drive system 10 for a construction vehicle such as an excavator which incorporates the present invention. While the invention is described in connection with the drive system 10 illustrated in FIG. 1, it is to be understood that the present invention can readily be adapted for use in other hydraulic drive systems.

The drive system 10 includes a source of pressurized fluid 11. Preferably, the source of pressurized fluid 11 includes first and second pumps 12a,b. While the pumps 12a,b are illustrated as having a fixed displacement, variable displacement pumps could also be utilized, as would be apparent to one skilled in the art. The pumps 12a,b are mechanically connected to an output shaft 22 of an engine 24 for rotation therewith. The speed of the engine 24 is regulated by an engine controller (not shown) in a manner well known in the art. Because the engine controller forms no part of the present invention, it is not further described.

The pumps 12a,b are adapted to provided pressurized fluid to first and second hydraulic drive motors 14a,b through hydraulic circuits 16a,b. The drive system 10 further includes first and second ground engaging devices 20a,b, such as tracks or wheels, which are connected to and driven by respective drive motors 14a,b. The ground engaging devices 20a,b are adapted to propel the vehicle at a speed and direction responsive to the speeds and directions of the motors 14a,b.

A pilot pump 26 is mechanically connected to the engine output shaft 22 for rotation therewith. The pilot pump 26 is adapted to provide pressurized fluid at a rate responsive to engine speed, as would be apparent to one skilled in the art.

A first means 79 is provided for producing a desired vehicle speed/direction signal corresponding to a desired speed and direction of travel for the vehicle. Preferably the first means 79 includes first and second control members 30a,b for controlling the speeds of the first and second motors 14a,b, respectively. Each control member 30a,b is positionable at a plurality of locations for indicating a desired speed and direction for a respective drive motor 14a,b. More specifically, the control members 30a,b are manually movable between first and second limits (R,F) which respectively indicate full speed reverse and full speed forward. The control members 30a,b are normally biased to an intermediate position N which corresponds to neutral. The control members 30a,b are illustrated as hand-operated control levers; however, typically, foot-operated control pedals (not shown) are integrally connected with the hand-operated levers such that the vehicle can be controlled by either the control levers or the foot pedals.

First and second sensors 80a,b are provided for sensing the positions of the control members 30a,b and producing first and second desired speed/direction signals in response thereto. Preferably, the first and second sensors 80a,b are in the form of potentiometers which produce output signals having a magnitude responsive to the position of the control members 30a,b. Such sensors are well known in the art and will not be explained in detail herein. A suitable rotary potentiometer is disclosed U.S. Pat. No. 4,915,075 which issued to Brown and is assigned to the assignee herein.

Alternatively, the first means 79 could be in the form of a single control member (not shown) for indicating a desired speed and direction of travel for the vehicle. Again a sensor is required for sensing the members' position and responsively producing a desired speed/direction signal.

A processor means 84 is provided for receiving the desired speed/direction signal(s) and processing the signal(s) to responsively produce first and second control signals for controlling the speeds of the first and second motors 14a,b. Preferably, the processor means 84 is implemented employing a microprocessor 85 with appropriate input and output signal conditioning circuits (not shown) as is well known in the art. Numerous commercially available devices are readily adaptable for performing the functions of the processor means 84. One suitable device is a series M68000 microprocessor as manufactured by Motorola Semiconductor Products, Inc. of Phoenix, Ariz.

The microprocessor 85 is programmed to receive the desired speed/direction signal(s), responsively retrieve stored data from memory, and produce the first and second control signals in response to the retrieved data and the desired speed/direction signal(s). The control signals are applied to first and second motor actuators 34a,b. Preferably, the first and second motor actuators 34a,b include solenoid actuated pilot valves 38a,b which preferably are three position proportional valves, each having a forward position (F), reverse position (R) and neutral (N) position. The pilot valves 38a,b are adapted to receive a pilot pressure from the pilot pump 26 and deliver a control pressure responsive to the magnitude of the first and second control signals. Each motor actuator 34 further includes a pilot actuated directional valve 46a,b. The directional valves 46a,b are hydraulically connected between the pumps 12a,b and the drive motors 14a,b. The directional valves 46a,b are three-position, pilot-actuated proportional valves. Each valve has a forward position (F), a reverse position (R) and a neutral position (N). These directional terms are employed purely for illustration purposes and should not be construed as limiting the present invention. The directional valves 46a,b are adapted to receive a pilot pressure from a respective pilot valve 38a,b and responsively control the direction and rate of fluid flow which is delivered to a respective drive motor 26a,b, as would be apparent to one skilled in the art.

More specifically, each pilot valve 38a,b includes a forward solenoid 86a,b and a reverse solenoid 88a,b for controlling the direction and displacement of a respective pilot valve 38a,b. Hence, the first and second signals each consist of forward and reverse signals which are delivered to respective forward and reverse solenoids 86,88. The first (left) forward control signal is communicated from the microprocessor 85 to the first (left) forward solenoid 86a via a conductor 90. The first (left) reverse control signal is communicated from the microprocessor 85 to the first (left) reverse solenoid 88a via a conductor 92. The second (right) forward control signal is communicated from the microprocessor 85 to the second (right) forward solenoid 86b via a conductor 94. The second (right) reverse control signal is communicated from the microprocessor 85 to the second (right) reverse solenoid 88b via a conductor 96.

The microprocessor 85 is programmed to controllably deliver one of the forward or reverse control signals to each of the pilot valves 38a,b to affect vehicle operation in accordance with the speed/direction signal(s). The magnitude of the control signal in turn controls the degree of displacement of the pilot valve 38a,b and hence the speed and direction of a respective motor 14a,b. If neither solenoid 86, 88 of a pilot valve 38 is actuated, the valve 38 is biased to the neutral position (N), thereby stopping the flow of pressurized hydraulic fluid to the drive motor 14.

In a preferred embodiment, the set speed means 64 is formed by the combination of the microprocessor 85 and operating software. More specifically, the microprocessor 85 has an input terminal 98 connected to the set switch output terminal 60 for receiving the set speed signal. If the microprocessor 85 detects the set speed signal, a set speed mode is entered. In the set speed mode, each control signal is maintained at a constant magnitude responsive to the magnitude of the desired speed/direction signal(s) upon reception of the set speed signal, thereby causing the vehicle to operate at a constant speed. FIG. 3 shows a portion of the cruise control of an embodiment of the present invention. This embodiment includes two set switches 54a,b, each set switch being positioned on one of the control levers 30a,b, respectively. From this description and the illustration of FIG. 3, it would be a mechanical step for one skilled in the art to position a set switch on a control lever.

In other applications, it may be desirable to locate a single set switch 54 on either of the hand-operated control levers 30a,b. This would allow easy switch activation when the operator is using the control levers to operate the vehicle. Implementation of this modification would be accomplished by simply removing one of the set switches 54a,b shown in FIG. 3. Preferably, the set switch 54 is in the form a two-position switch which is adapted to produce an output signal in the closed position. For this purpose, the set switch 54 has an input terminal 56 connected to a source of electrical power 58, such as the vehicle battery. When the set switch 54 is closed, a set speed signal is produced at an output terminal 60 of the switch 54.

Referring now to FIG. 2, an embodiment of software for programming the microprocessor 85 in accordance with certain aspects of the present invention is explained. FIG. 2 is a flowchart illustrating a computer software program for implementing the second embodiment of the present invention. The program depicted in this flowchart is particularly well adapted for use with the microprocessor and associated components described above, although any suitable microprocessor may be utilized in practicing an embodiment of the present invention. This flowchart constitutes a complete and workable design of the preferred software program. The software program may be readily coded from these detailed flowcharts using the instruction set associate with this system, or may be coded with the instructions of any other suitable conventional microprocessors. The process of writing software code from flowcharts such as these is a mere mechanical step for one skilled in the art.

Initially, in the block 100, it is determined if the set speed signal is being produced by the set switch 54. If the set speed signal is not detected, control is passed to a main control program (not shown). The main control program causes the motors 14a,b to operate at a speed and in a direction responsive to the position of the control members 30a,b, as is common in the art.

If the set speed signal is detected, control is passed to the block 105 where the desired set speed is detected. More specifically, the microprocessor 85 reads the speed/direction signal(s) from the first and second sensor 80a,b. The desired speed/direction signal(s) are then processed to produce the control signals in the block 110. The control signals are maintained at a constant magnitude responsive to the speed/direction signal detected in the block 105.

The control signals are continuously delivered to the pilot valves 38a,b until either the set switch 54 is moved to the open position or until the control members 30a,b are moved a preselected distance from the neutral position. These functions are illustrated in the blocks 120 and 130, respectively. In the block 120, the microprocessor 85 samples input terminal 98 to determine if the set speed signal is still being produced. If the set speed signal is not detected, control is returned to the main program. Conversely, if the set speed signal is detected, control is passed to the block 130. In the block 130, the microprocessor 85 determines if the control members 30a,b have been moved from the neutral position following initialization of the cruise control mode.

As was mentioned above, the control members 30a,b are normally biased to the neutral position. In operation of the set speed mode, the operator runs the machine at the desired speed and then activates the set speed mode by moving the set switch 54 to the second (closed) position. The operator then releases the control members 30a,b and they return to their neutral position. The microprocessor 85 continuously monitors the desired speed/direction signals to determine if the control members 30a,b are subsequently moved from their neutral position. The tests in block 120 and 130 are repeatedly performed until one is answered in the affirmative, at which point control is passed to the the main program, thereby returning control of motors 14a,b to the control members.

Industrial Applicability

Assume the present invention is installed on an excavator. Normally, the excavator is positioned at a job site and remains stationary during its digging operations. At some point it may be desirable to move the excavator to another location some distance away. While traveling between the two locations, the operator can activate the set speed mode. In operation of the set speed mode, the operator manipulates the control members 30a,b to achieve the desired speed and direction of travel. When the desired speed and direction are achieved, the operator activates the set speed mode by moving the set switch 54 to the second position. When the set switch 54 is in the second position, the set speed signal is produced.

In the first embodiment, the set speed signal energizes the first and second solenoids 68a,b, thereby locking the control members 30a,b at their then-present position. In the second embodiment, the set speed signal is detected by the microprocessor 85 which responsively maintains the control signals at a constant magnitude responsive to the then-present position of the control members 30a,b. In either embodiment, the vehicle continues to operate at the set speed until the set switch 54 is moved to the first position or until the control members 30a,b are subsequently moved by a preselected amount.

The hydraulic and electrical circuitry utilized in design of the present invention are well known in the art. It is the unique application of these components that solves the problems set forth herein and forms the basis for the present invention.

Other objects, aspects and advantages can be obtained from a study of the drawings, the disclosure and the appended claims.

We claim:

1. An apparatus for use in a vehicle having a source of pressurized fluid, first and second hydraulic drive motors connected to the pressurized fluid source and powered thereby, and first and second ground engaging devices connected to and driven by the first and second motors respectively, comprising:

first and second control members positionable at a plurality of locations for selecting a desired speed and direction for a respective drive motor;

first and second sensors connected to said first and second control members, wherein said first and second sensors produce a first and second control member position signal;

first and second actuators connected to the first and second drive motors to responsively control fluid flow to the respective drive motor;

a set switch being movable between first and second positions, wherein said set switch produces a set speed signal in the second position; and set speed means connected to the first and second sensors and the first and second actuators, said set speed means for receiving the set speed signal and causing the first and second actuators to operate the drive motors at a constant speed in response to the set speed signal, the speed of the motors being responsive to the value of the first and second control member position signals upon reception of the set speed signal.

2. An apparatus as set forth in claim 1 wherein the set speed means maintains the control members at one of a plurality of locations upon reception of the set speed signal, thereby causing the drive motors to operate at a constant speed.

3. An apparatus as set forth in claim 1 wherein the set speed switch is positioned on one of the first and second control members.

4. An apparatus as set forth in claim 1 wherein first and second set speed switches are provided for setting the speeds of the first and second motors respectively.

5. An apparatus for use in a vehicle having a source of pressurized fluid, first and second hydraulic drive motors connected to the source of pressurized fluid and powered thereby, and first and second ground engaging devices connected to and driven by the first and second motors, respectively, comprising:

first means for producing a desired speed/direction signal corresponding to a desired speed and direction of travel for the vehicle;

processor means for receiving the desired speed/direction signal and processing the signal to responsively produce first and second control signals, respectively;

first and second actuators connected to the processor means, wherein said first and second actuators receive the first and second control signals, respectively, and responsively control fluid flow to the first and second drive motors;

a set switch being movable between first and second positions, said set switch producing a set speed signal in the second position; and wherein said processor means receives the set speed signal and responsively enters a set speed mode wherein the first and second control signals are maintained at a constant magnitude which is responsive to the magnitude of the desired speed/direction signal upon reception of the set speed signal, thereby causing the drive motors to operate at a constant speed.

6. An apparatus as set forth in claim 5, wherein the first means includes first and second control members, each being positionable at a plurality of locations for indicating a desired speed and direction for a respective drive motor; and first and second sensor means for sensing the positions of the control members and responsively producing first and second desired speed/direction signals respectively.

7. An apparatus as set forth in claim 5, wherein the first means includes a control member positionable at a plurality of locations for indicating a desired speed and direction of travel for the vehicle and a sensor means for sensing the positions of the control member and responsively producing a desired speed/direction signal.

8. An apparatus as set forth in claim 6 including a means for detecting if either of the control members is moved by more than a preselected amount during production of the set speed signal and responsively terminating the set speed mode.

9. An apparatus as set forth in claim 6 wherein the set speed switch is positioned on one of the first and second control members.

10. An apparatus as set forth in claim 6 wherein first and second set speed switches are provided for setting the speeds of the first and second motors, respectively.

11. An apparatus for use in a vehicle, comprising:

an engine;

first means for producing a desired speed/direction signal corresponding to a desired speed and direction of travel for the vehicle;

first and second fluid pumps driven by the engine and being adapted to provide pressurized fluid;

first and second fluid powered drive motors being hydraulically connected to the first and second pumps, respectively, and being adapted to receive pressurized fluid from the pumps;

first and second ground engaging devices connected to and powered by the first and second motors, respectively;

processor means for receiving the desired speed/direction signal and processing the signal to produce first and second control signals respectively;

first and second pilot valves connected to said processor means, wherein said first and second pilot valves receive the first and second control signals and responsively control fluid flow to the first and second motors, respectively;

a set switch being movable between first and second positions, wherein said set switch produces a set speed signal in the second position; and wherein said processor means receives the set speed signal and responsively enters a set speed mode wherein the first and second control signals are maintained at a constant magnitude, which is responsive to the magnitude of the desired speed/direction signal upon reception of the set speed signal, thereby causing the drive motors to operate at a constant speed.

12. An apparatus as set forth in claim 11, wherein the first means includes first and second control members, each being positionable at a plurality of locations for indicating a desired speed and direction for a respective drive motor; and first and second sensor means connected to said first and second control members, said first and second sensor means for sensing the positions of the control members and responsively producing first and second desired speed/direction signals.

13. An apparatus as set forth in claim 11, wherein the first means includes a control member positionable at a plurality of locations for indicating a desired speed and direction of travel for the vehicle; and sensor means connected to said control member, said sensor means for sensing the positions of the control member and responsively producing a desired speed/direction signal.

14. An apparatus as set forth in claim 12 wherein the set speed switch is positioned on one of the first and second control members.

15. An apparatus as set forth in claim 13 wherein first and second set speed switches are provided for setting the speeds of the first and second motors, respectively.

* * * * *